(12) United States Patent
Berlin et al.

(10) Patent No.: US 8,009,088 B2
(45) Date of Patent: Aug. 30, 2011

(54) METHOD AND TRANSIT TIME TESTER FOR MONITORING THE TRANSIT TIME OF SMALL-SIZED GOODS TO BE CONVEYED, PARTICULARLY OF LETTERS AND SIMILAR MAIL ITEMS

(75) Inventors: Bernhard Berlin, Berlin (DE); Rolf Kupfernagel, Berlin (DE); Holger Paetsch, Zernsdorf (DE)

(73) Assignee: Siemens Aktiengesellschaft, Munich (DE)

( * ) Notice: Subject to any disclaimer, the term of this patent is extended or adjusted under 35 U.S.C. 154(b) by 504 days.

(21) Appl. No.: 12/075,730

(22) Filed: Mar. 13, 2008

(65) Prior Publication Data

US 2008/0258970 A1    Oct. 23, 2008

(30) Foreign Application Priority Data

Apr. 19, 2007    (DE) .................. 10 2007 018 633

(51) Int. Cl.
*G01S 19/14* (2010.01)
*G01S 19/34* (2010.01)

(52) U.S. Cl. ............... 342/357.52; 342/357.74
(58) Field of Classification Search ............ 342/357.74, 342/357.64, 357.527
See application file for complete search history.

(56) References Cited

U.S. PATENT DOCUMENTS

| | | | | |
|---|---|---|---|---|
| 5,592,173 A * | 1/1997 | Lau et al. | ................. | 342/357.12 |
| 5,903,856 A * | 5/1999 | Rompe | .................... | 702/176 |
| 6,281,797 B1 * | 8/2001 | Forster et al. | ............. | 340/572.3 |
| 6,429,810 B1 * | 8/2002 | De Roche | ................ | 342/357.07 |
| 6,944,574 B2 * | 9/2005 | LeBlanc et al. | ............... | 702/187 |
| 7,573,422 B2 * | 8/2009 | Harvey et al. | ............ | 342/357.06 |
| 2002/0030625 A1 | 3/2002 | Baker | | |
| 2002/0177476 A1 * | 11/2002 | Chou | ............................ | 455/574 |
| 2004/0186691 A1 | 9/2004 | LeBlanc et al. | | |
| 2005/0080566 A1 | 4/2005 | Vock et al. | | |

FOREIGN PATENT DOCUMENTS

| | | |
|---|---|---|
| DE | 4404195 C1 | 8/1995 |
| DE | 19619068 A1 | 11/1997 |
| WO | 0140818 A1 | 6/2001 |
| WO | 2006053566 A1 | 3/2006 |

OTHER PUBLICATIONS

"Tracking"; Wikipedia; online Mar. 19, 2007 at http://de.wikipedia.org/w/index.php?title=Tracking&oldid=29374113; pp. 1-2.

* cited by examiner

*Primary Examiner* — Gregory C Issing

(57) ABSTRACT

Disclosed is a method and a transit time tester for monitoring the transit time of an item to be conveyed, particularly a mail consignment, wherein the movements of a consignment are registered and stored in a transit time tester for later evaluation of the sequence of transportation. The transit time tester is equipped with sensors, satellite-based positioning system (GPS) receiver and storage media, corresponding in its dimensions and characteristics to the item to be conveyed to be monitored and determined from the sensor data the current type of conveyance with the aid of a microprocessor. To be monitored, the transit time and the routes of transportation of standard letters and similar mail consignments over a number of days. The receiver for the GPS is selectively switched on and off as a function of the changing conditions of reception and the current type of conveyance of the item to be conveyed.

19 Claims, 15 Drawing Sheets

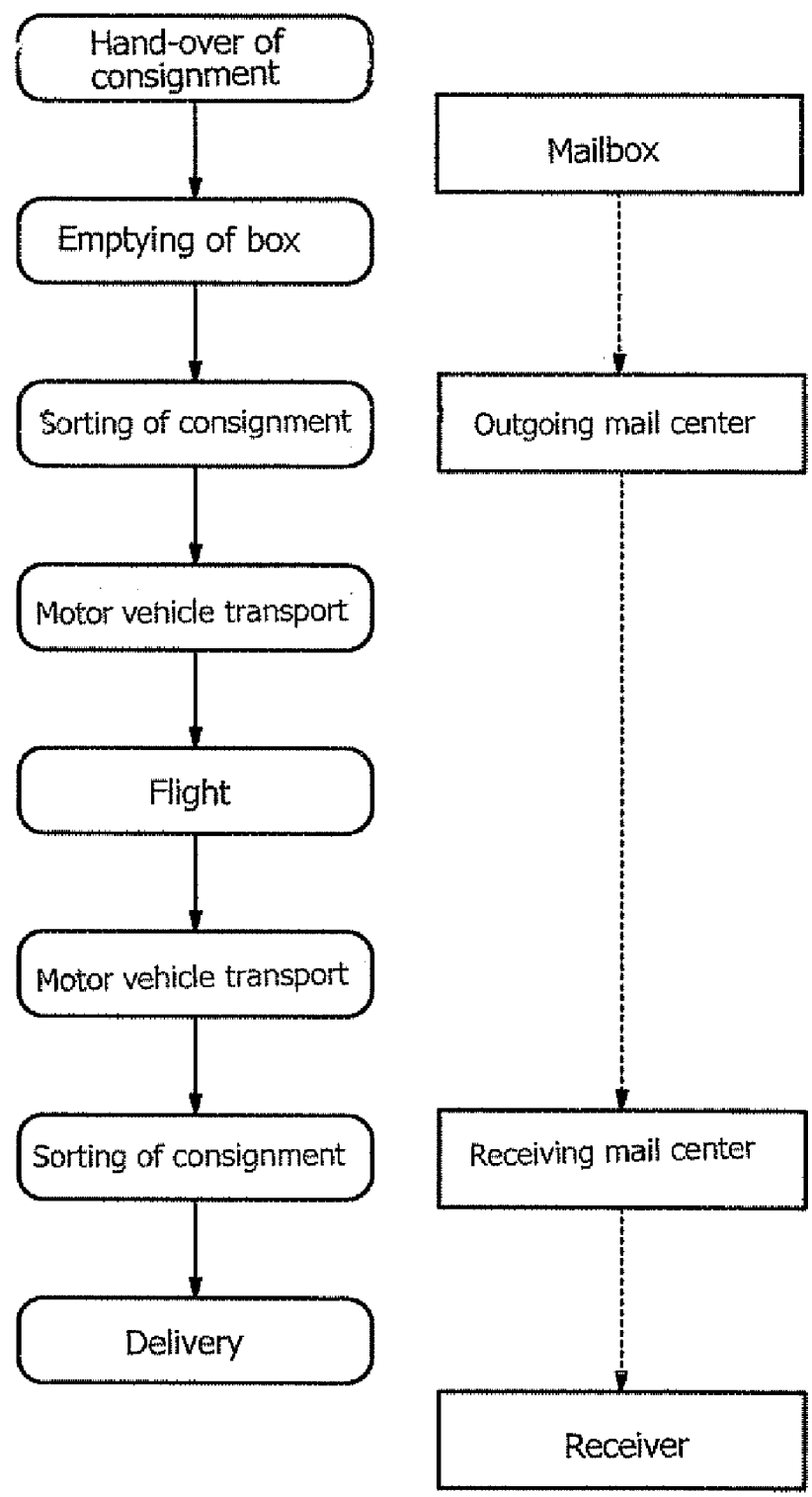

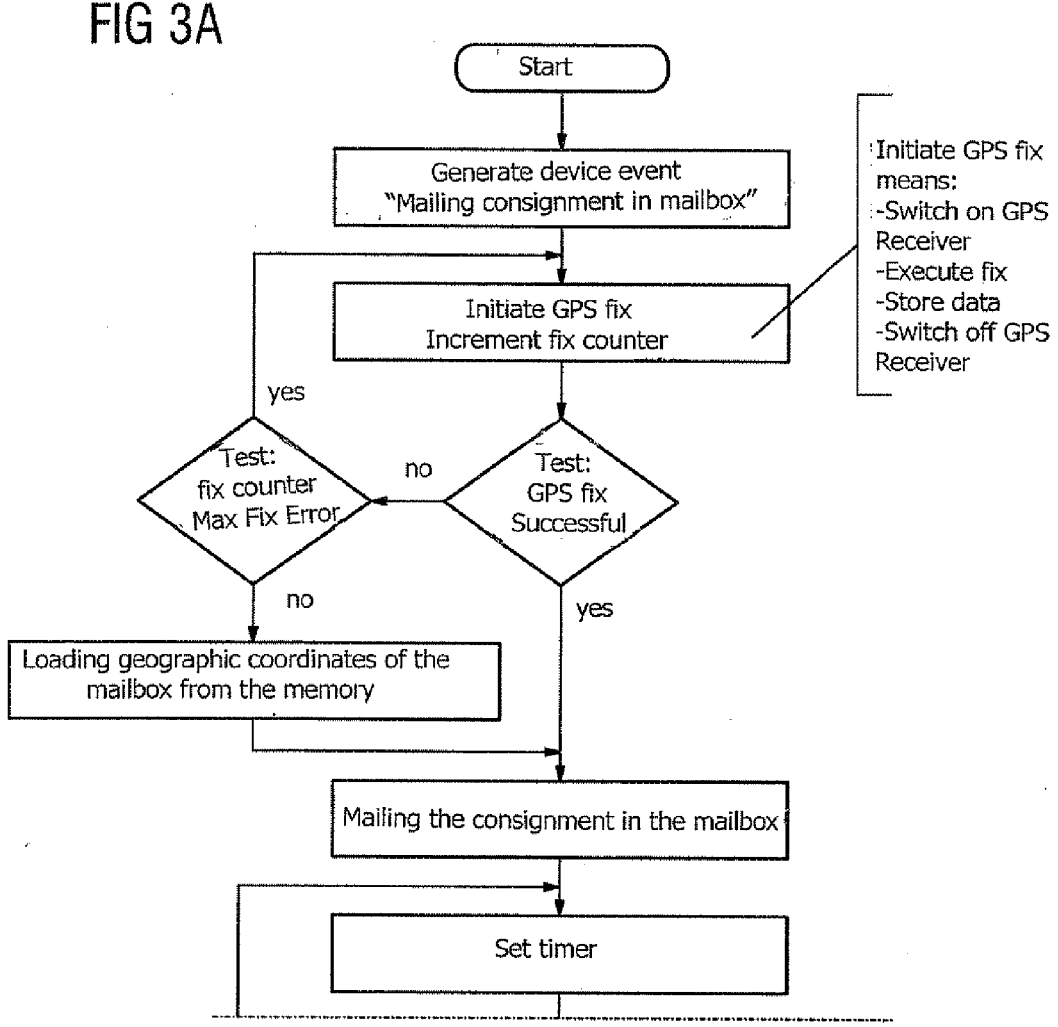

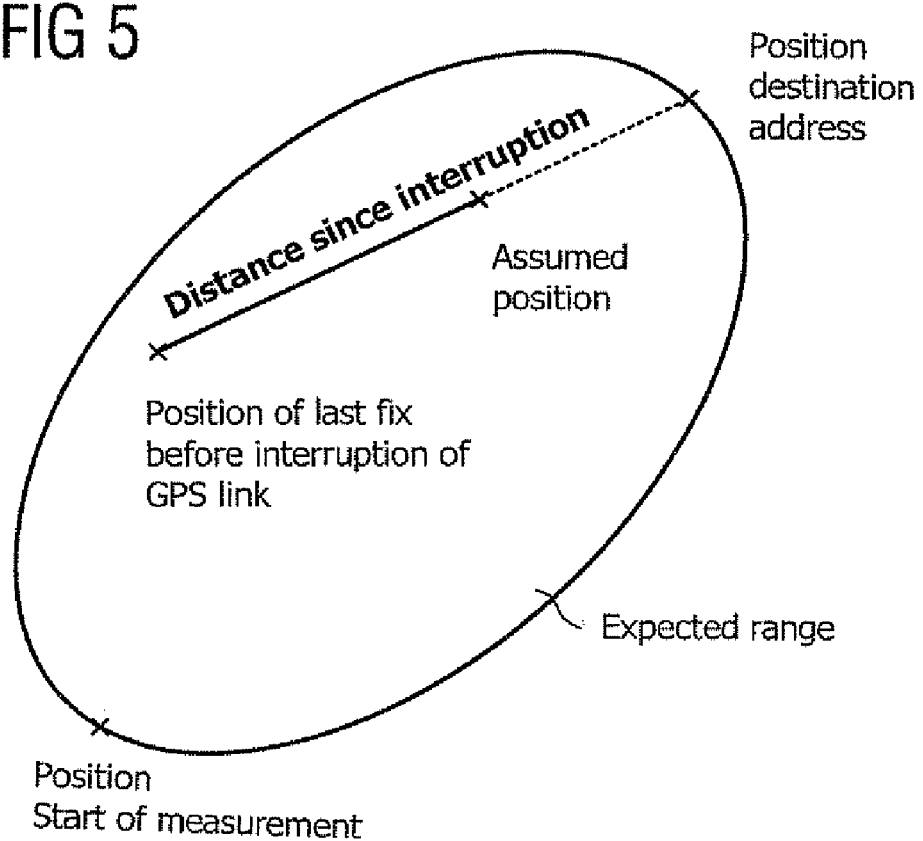

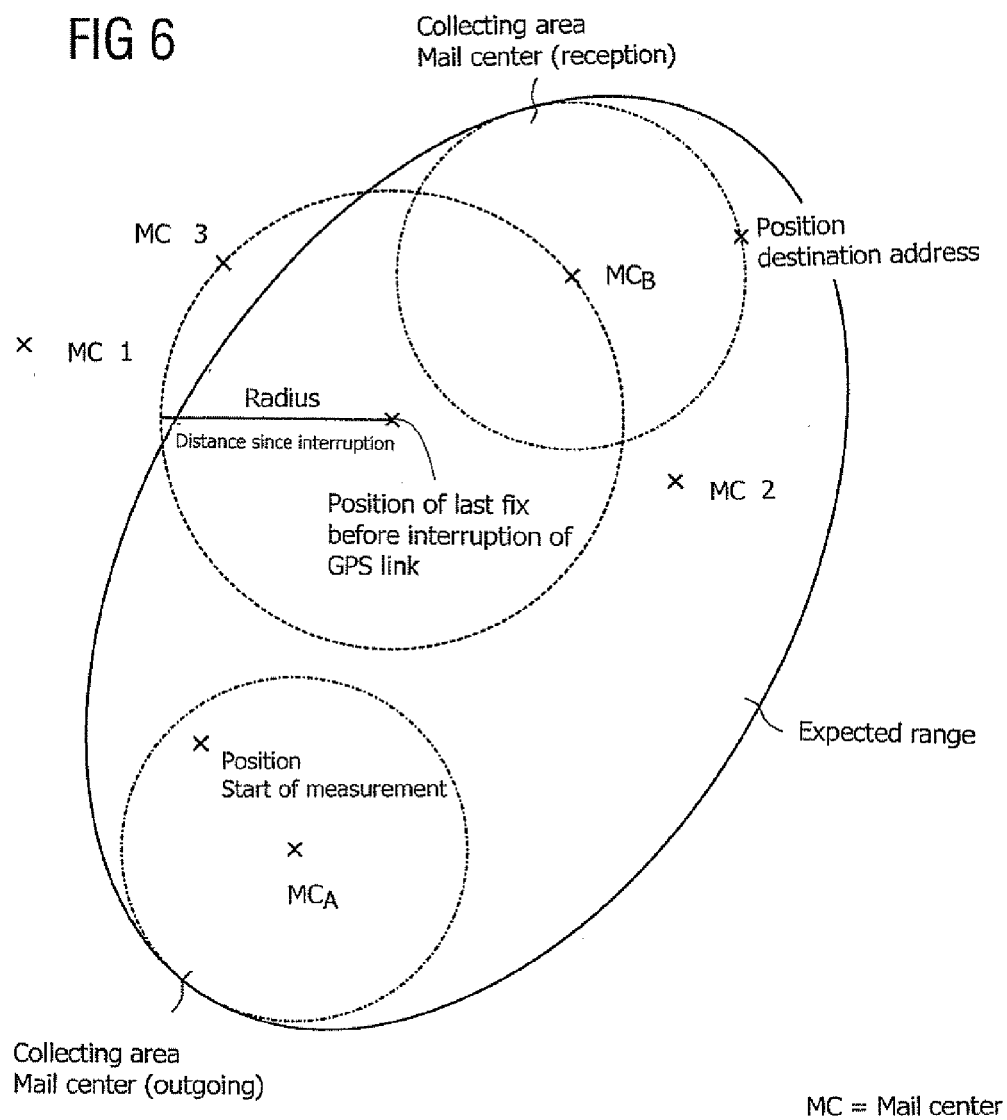

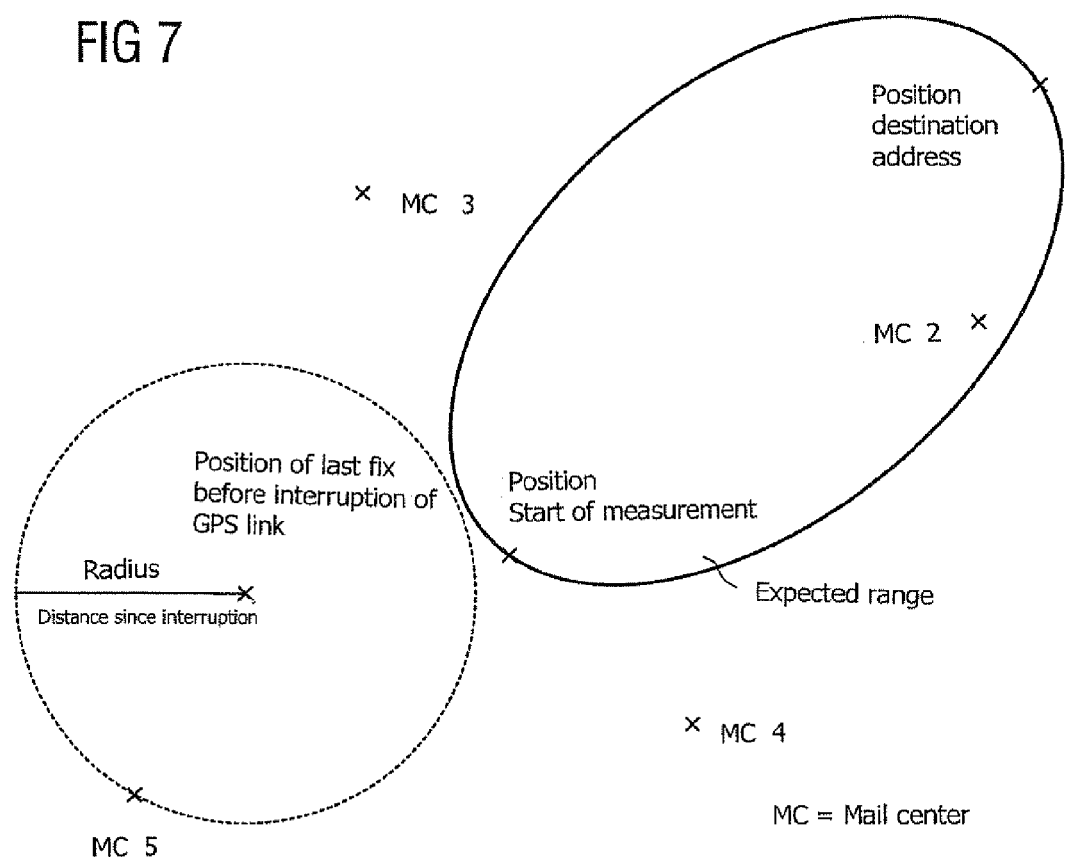

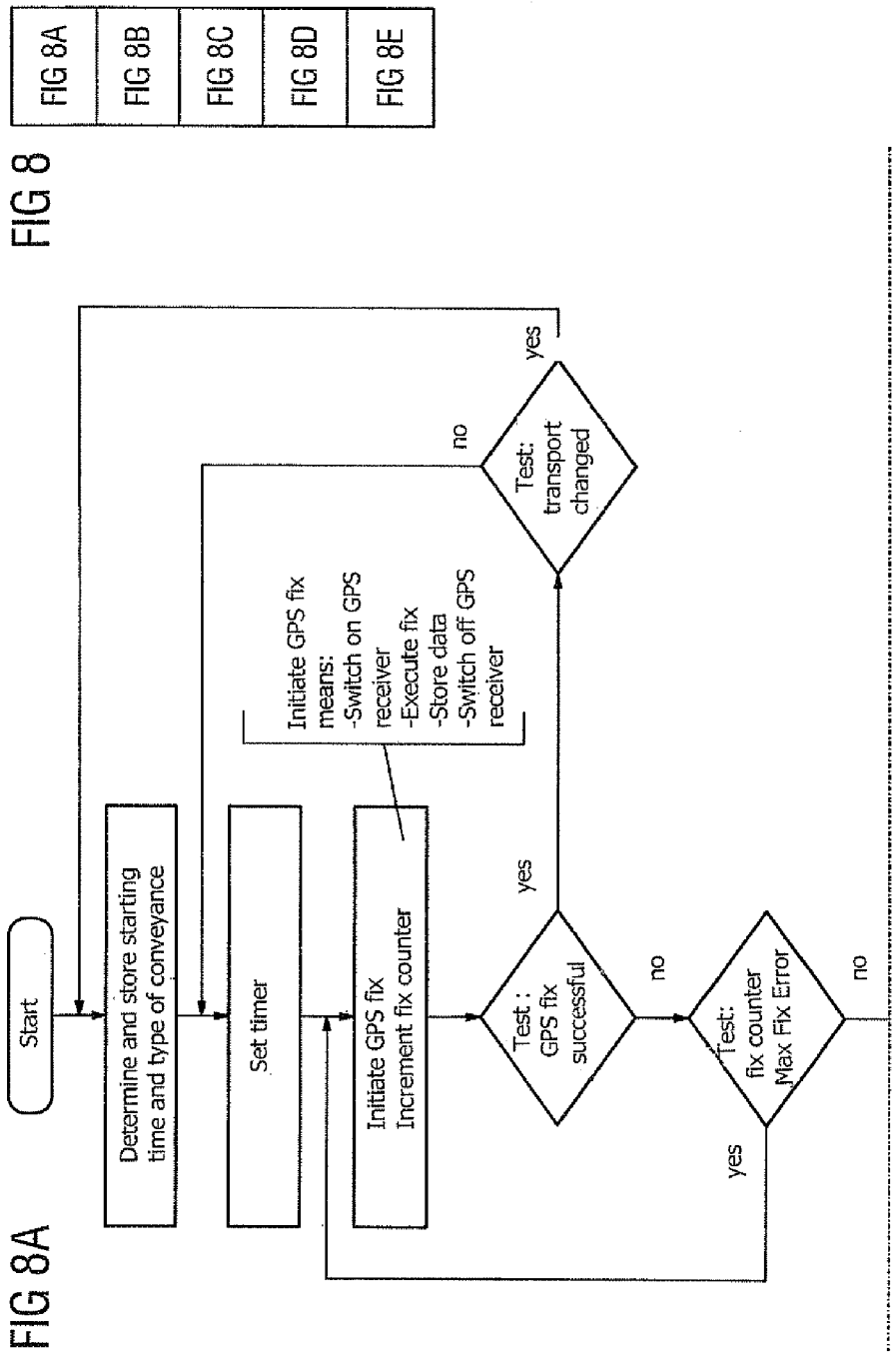

METHOD AND TRANSIT TIME TESTER FOR MONITORING THE TRANSIT TIME OF SMALL-SIZED GOODS TO BE CONVEYED, PARTICULARLY OF LETTERS AND SIMILAR MAIL ITEMS

CROSS REFERENCE TO RELATED APPLICATIONS

This application claims the benefits of German application No. 10 2007 018 633.0 filed Apr. 19, 2007, and is incorporated by reference herein in its entirety.

FIELD OF INVENTION

The present invention relates to a method and to a transit time tester for monitoring the transit time of an item to be conveyed, particularly a mail item, in which the movements of a consignment are registered and stored in a transit time tester for later evaluation of the sequence of transportation, for which purpose the transit time tester is equipped with sensors, GPS receiver and storage media, corresponds in its dimensions and characteristics largely to the item to be conveyed to be monitored and determines from the sensor data the current type of conveyance with the aid of a microprocessor.

BACKGROUND OF THE INVENTION

To check the transit time of mail items, it is known to use so-called transit time testers which are posted with the mail item to be transported and contain devices by means of which the sequence of movement of the mail items is registered. Known devices of this type contain motion sensors which register the movement of the consignment over its entire mailing time. Forces occurring during the transportation are registered in a motion/time diagram; if the consignment is at rest, i.e. there is no transport, there is no recording, either. The recorded motion/time diagram can be evaluated later at a central position. A nominal/actual comparison enables any stops in the delivery or mailing to be localized since the routes of transportation and transportation times are known as a rule.

Transit time monitoring devices in conventional letter thickness are also known which have a memory for detecting the measurement values and evaluating electronics. These transit time monitoring devices are arranged in such a manner that they can be processed in mail sorting machines and are not separated during the stiffness measurement in the mail processing machines of the post offices. Such devices can be used, e.g. for determining whether the consignment has been completely at rest in an inadmissible manner for a number of days after transportation for several hours.

The known devices have the disadvantage that they only provide for detection of the states of motion and of rest but do not allow any more accurate distinction of the type of movement actually occurring during a motion state, or even of the means of transportation used.

A device for monitoring the transit time of goods to be conveyed, by means of which the means of transportation, transport events and types of movement used during the mailing time can be identified, is known from DE 44 04 195 C1. It consists of an acceleration sensor, a microcontroller with integrated analog/digital converter and a RAM memory. The device is arranged in the format of a standard C6 letter in such a manner that it can be processed in mail sorting machines and is not separated out during the stiffness measurement in the letter processing machines in the post offices. In all process steps of letter conveyance and processing, the device behaves like a normal letter of paper. This ensures the reliability of the data obtained in the letter conveyance and processing process and an increase in the functional reliability and usage period.

A motion sensor in a "letter" constructed in this manner outputs a sensor signal proportional to acceleration which is digitized by the analog/digital converter (ADC). The signal is processed further in a microcontroller to form frequency spectra which are stored in compressed form in the memory. After the conclusion of the recording of the measurement values, the stored spectra are read out and evaluated. During this process, the frequency spectra are correlated in time with the temporal sequence of the movement of the device during the transportation. Since the various transport media such as, for example, motor vehicles, rail, transportation on foot or flight in each case display characteristic spectral variations, the means of conveying can be identified, in the most favorable case, by means of the variation with time of the transportation process.

In a further known method, so-called quality test letters (QTL) are also used in which the physical characteristics during the transportation are recorded with time and then read out and classified in accordance with the steps of the transportation process. In this context, all possible nominal transport sequences of each QTL consignment sent out with the selected conditions of conveyance are automatically generated from defined transport rules between the nodes of the logistic network and from the description of the sequences in the nodes and the relations of the nodes with one another. The QTL consignments are identified in the nodes and the actual transport sequence is determined from the location/time relations. Weak points can be determined by comparing the nominal transport sequences and the actual transport sequence.

However, the known devices cannot be used for obtaining precise location information. For the determination of the current location, only two methods are essentially known: the radio cell location and position finding with the aid of satellite systems (e.g. GPS, Galileo or GLONASS).

The accuracy of radio cell location depends on the size of the radio cells. As a result, the accuracy of the position determination also differs greatly. Depending on the prevailing conditions, it is between 50 m and up to 30 km and more. For this reason, radio cell location is not suitable for the purposes of transit time monitoring and position determination of mail items.

Much more accurate position determination is possible with the aid of satellite systems. Known GPS data loggers (GPS loggers in the sense of the patent are all devices which can determine and store the current geographic position of the device from satellite data, independently of the satellite system used) exclusively determine position information as a function of time. The current generation of processors for GPS data loggers with internal signal processing for calculating the current geographical coordinates consume much energy, however, which only plays a subordinate role in monitoring means of conveyance and relatively large transportation units (such as, e.g. containers and vehicles). However, the energy demand is so high that it is not possible to implement a GPS data logger for a transit time of a number of days which corresponds in size, thickness, weight and stiffness to a standard letter consigned, and, at the same time, withstands the enormous loads in mail sorting machines.

A further disadvantage is that GPS receivers always need a relatively free view of the satellite. If the mail consignments are conveyed, for example, in a steel container or if the mail consignment is in a metal mailbox, the satellite signal cannot be received. Once the GPS receiver can again receive the satellite signals, it needs a relatively long time for being able to determine its position again since the current position of the GPS receiver is unknown. As a result, very much energy is used over a relatively long time. However, GPS receivers are known which detect rest by means of acceleration sensors and increase the cycle time for determining the geographical coordinates in the case of relatively long rest phases. This makes it possible to save energy.

SUMMARY OF INVENTION

On the basis of the above problems and inadequacies in the prior art, the invention is based on the object of creating a transit time tester and a method for monitoring the transit time and the route of transportation of goods to be conveyed, particularly of standard letters and similar mail items, by means of which the means of conveyance used and, at the same time, the change in position of the consignment can be registered and recorded over a number of days.

To achieve the object, it is proposed that the receiver for the satellite-based positioning system (GPS) can be selectively switched on and off as a function of the changing conditions of reception and/or the current state of conveyance of the item to be conveyed. Geographic positions of the consignment on its route of transportation are determined with the aid of satellite-based positioning systems (GPS) and the received data are aligned with data stored in the transit time tester and/or with measured physical quantities acting on the consignment during the transportation and stored data. Using the satellite-based positioning system, the means of conveyance used and the changes in position of a consignment can be monitored and recorded with high reliability and accuracy so that, aligning the positioning data of the consignment with physical quantities acting on the consignment makes it possible to enhance the precision of the acquisition and provide position information about the consignment over the entire path of shipment. Due to the fact that it is proposed according to the invention to switch the receiver for the satellite-based positioning system (GPS) deliberately on and off as a function of the changing conditions of reception and the current type of conveyance of the consignment, the energy requirement for monitoring a consignment of small size, for example a weight of no more than 60 g, a thickness of less than 5 mm and dimensions of not greater than 210 nm×100 mm can be lowered in such a manner that a transit time of the transit time tester of a number of days can be achieved without problems.

According to the invention, it is proposed that the cycle times in which the geographic position of the consignment is determined are adapted to the postal processes typical of the consignment. As a rule, mail items pass through typical processing and transportation processes which, in turn, are characterized by the use of the corresponding means of conveyance. Knowing these processes and the nature of the means of conveyance used, the type of which has an influence on the reception of the satellite signals, the cycle times can be set up in an energy-saving manner.

According to the invention, a further possibility for saving energy consumption is achieved by the fact that, after the satellite link to the transit time tester has been interrupted, the current position is calculated from the existing data. Pure mathematical operations provide a relatively reliable prognosis of the current position so that high-energy procedures of the GPS receiver, (e.g. frequent cold starts) are avoided.

The means of conveyance used, by means of which the mail consignment is transported, can be determined with the aid of measurements of the physical quantities acting on the device. Thus, the means of conveyance such as, e.g. motor vehicle, aircraft etc., can be detected from a predefined number of periodically determined and digitized measurement values of an acceleration sensor provided in the transit time tester; this is because each of these means of conveyance displays an acceleration characteristic which is typical of it. According to the invention, it is thus possible to determine the take-off and/or landing phases of aircraft used for transporting the consignment by evaluating peak accelerations and the alignment of the acceleration in space with the aid of the acceleration sensors provided.

According to a further proposal of the invention, it is provided that flight phases are detected with the aid of an air pressure sensor provided in the transit time tester. Since the air pressure in the aircraft is significantly lowered during the flight in current aircraft, the flight phase can be detected in a simple manner by means of the low air pressure with the aid of the air pressure sensor. This applies, in particular, because the air pressure is distinctly lower in the freight compartments of the aircraft because there is no pressure compensation there.

Furthermore, the influence of the nature of the means of conveyance used in the process chain for a typical transportation consignment on the reception of the satellite signals can be used as a clue for the determination of the position of the consignment. As a rule, the process chain for a typical letter conveyance contains a number of typical processing and transportation processes which, in turn, are characterized by the use of corresponding means of conveyance. The nature of these means of conveyance, in turn, has an influence on the reception of the satellite signals.

Thus, very high transverse accelerations measured by means of-the acceleration sensor can be used for detecting the location of a consignment in a mail or sorting center. In the mail centers, the consignments pass through a series of mechanical sorting steps. The consignments are transported at a speed of $\geq 3.0$ m/s in the sorting machines. In this process, a very high transverse acceleration is produced at the rerouting rollers which only occurs in the sorting machines. In this manner, passes through machines and thus the location of a consignment in a letter or sorting center can be unambiguously determined. The time of mail processing can be correspondingly stored in the device.

For the postal services, the first and last mile (box emptying and delivery) and when and where the consignments have been sorted are of particular interest. A list of geographic coordinates and other data useful for controlling the device can be stored already during the initialization of the transit time tester in the memory of the controller.

According to the invention, at least some of the following data are stored in the memory of the controller during the initialization of the transit time tester:

list of the geographic coordinates of all mail centers
    geographic coordinates of the starting location (e.g. mailbox)
    geographic coordinates of the destination (receiver)
    geographic coordinates of the initialization place
    time interval for the GPS acquisitions to be performed as a function of the current transportation process or the location, respectively
    predicted duration of the measurement (target transit time)

Since it is the topmost aim of the controller of the GPS receiver to save energy and, e.g. avoid unnecessary cold starts because the latter require particularly good conditions of reception and at the same time last the longest, the current almanac data are loaded into the GPS receiver already during the initialization of the device in order to prevent unnecessary repetitions of the connection set-up to the satellites in poor conditions of reception. For relatively long transit time monitoring periods, the necessary almanac data of the period to be expected can also be calculated in advance and stored in the memory of the controller. Thus, e.g. the necessary almanac data of the next 2 weeks can be precalculated at the workstation PC and stored retrievably in the memory. At the same time, the current ephemerides data determined by the GPS receiver are stored in the memory of the controller. Using these data, the necessary ephemerides data can then be calculated in the controller after a link loss.

The transit time tester is capable of recognizing changes in the type of transportation. It is to be assumed that with a change in the means of conveyance, the conditions of reception also change and thus a new attempt to set up a link promises success. According to the invention, however, it is provided that the GPS system, after a predetermined number of attempts, is switched off if the type of transportation or the means of conveyance does not change and the conditions of reception in a means of conveyance remain the same over a relatively long time. This makes it possible to save considerable energy.

According to the invention, a further possibility for saving energy is created by the fact that the GPS receiver is switched on only periodically, in each case for a short time, for determining the position of the consignment in accordance with the requirements and in the knowledge of the individual types of transportation or processes. By implementing different cycle times for determining the location of the consignment, using the known processes as a basis, the receiver does not need to receive over a long period without any disadvantage for later position finding after the change of a step in transportation or means of conveyance.

If, e.g., the controller finds that the device is located in a particular mail center, for example in the receiving mail center, the corresponding measuring regime can be started. If after the sorting, the sensors detect the beginning of delivery within the defined time window, the cycle time provided is activated and deactivated again in the next relatively long rest phase.

According to another feature of the invention, it is provided that there is an event generator, implemented via infrared or RF remote control, which informs the transit time tester about the mailing of the consignment in the mailbox, which triggers immediate position determination of the GPS receiver. The transit time tester detects certain events stored in the device and uses these for controlling the device. Whilst the transit time tester is located in the mailbox, the acceleration sensors detect rest position. The cycle time for position determination can thus be increased to the maximum possible time which still guarantees adequate time for the next position finding (fix). Even though no reception is possible within the mailbox, the precise position of the device is known, however, in order to provide energy-saving reestablishment of the link to the satellite after leaving the mailbox.

According to another proposal of the invention, the GPS receiver is switched off when the starting phase of the transport aircraft is detected and is activated only after the landing phase is detected. Since a poor reception, or none at all, must be assumed in the freight compartments of aircraft, the repetitive energy-consuming attempt of establishing contact between transmitter and receiver during the flight phase is prevented in an energy-saving manner by switching off the GPS receivers after detecting the starting phase and by switching them on again only in the landing phase.

Naturally, it is also possible to monitor the flight phase in better conditions of reception (e.g. if the consignments are transported in the passenger cabin of an aircraft).

To achieve faster establishment of a link after a flight after an interruption of the GPS link, it is possible to proceed with the list of mail centers as in the case of position finding. In addition, the permissible relations can be defined via a matrix. As a result, non-existing links can be excluded; however, it requires a list of geographic coordinates of the airports used for the transportation of mail consignments. The trigger is the detected landing. From the flight time, the approximate distance is determined which has been traveled by the device with the aircraft.

After an interruption of the GPS link, the geographic coordinates of the current location must be known if a cold start of the GPS receiver is to be avoided. To determine the position of the data logger, it is checked, for example after an interruption of the GPS link, whether the position of the last fix before the interruption of the GPS link is located within the expected space. The distance traveled since the interruption of the GPS link can be calculated from the duration of transportation in the individual types of conveyance multiplied by the average speed.

In the case of an interruption of the link to the GPS satellites during the transportation, the average speed can be determined from the preceding GPS records since the beginning of the transportation. A check is made whether the position of the last fix before interruption of the GPS link is within the expected space and the distance since interruption of the GPS link is determined. In the determination of the average speed, relatively short rest periods such as pauses, standing times when tanking at the refueling place and similar are also taken into consideration. Should it not be possible to determine a credible speed from the GPS records, a speed typical of the type of conveyance is assumed.

If the distance since interruption of the GPS link falls below a specified distance, recalculation of the position can be dispensed with and the GPS fix can be initiated with the position on interruption of the GPS link.

If, however, a machine pass is registered by the device after an interruption of the GPS link, it must be assumed that the device is located in a mail center. According to the invention, this enables the position to be determined unambiguously, as a rule, because the device has stored the coordinates of the mail centers.

If the position of the last fix before interruption of the GPS link lies within the expected range, only mail centers located within the expected range are taken into consideration for position finding according to the invention. In this case, the controller determines the distance since interruption of the GPS link (duration of the individual types of conveyance x average speed). A circle with a radius of the distance since interruption of the GPS link is then drawn around the position of the last fix before interruption of the GPS link. After that, a check is made whether the position of a mail center is located on this circle within the expected range. Several positions can also be considered as a result. In this case, it is attempted in accordance with a particular scheme to establish a GPS link sequentially with the individual coordinates.

If the last fix before interruption of the GPS link is outside the expected space, it must be assumed that a misrouting has been detected. Here, too, a circle with a radius of the distance since interruption of the GPS link is drawn around the position of the last fix before interruption of the GPS link. When a number of mail centers are found, the solutions are discarded and a cold start is initiated.

According to the invention, the transit time tester checks whether the preconfigured cycle time and the energy reserve still present for supplying the components of the transit time tester correspond to one another. If it is found that the energy still available is no longer sufficient for guaranteeing the measurement up to the destination, the cycle times are increased, according to the invention, and the recordings of the number of position points are reduced.

The energy reserve is determined by logging the charging current up until the limit voltage has been reached after a first complete discharge of the batteries. By logging the current consumption of the individual components with time and measuring the current (with time) which flows into the batteries during further charging processes it is possible to periodically calculate the currently available energy reserve of the transit time tester by means of the controller according to the invention at any time. To avoid loss of data and damaging the power supply due to a total discharge, the controller can prevent the energy reserve from dropping below a predetermined measure.

The transit time tester according to the invention is characterized by a data logger with a GPS receiver, an intelligent power supply with monitoring of the available energy, with sensors for measuring the physical quantities such as acceleration and air pressure, from which a microprocessor detects the current types of conveyance and controls the transit time tester, and an event generator, for example an infrared or RF receiving unit for starting special procedures of the transit time tester. By means of the individual components, the controller is capable of recognizing and monitoring the various processes in order to determine whether a transportation process is still ongoing or has already ended. The GPS receiver provides for direct positioning of the transit time tester as soon as reception is possible or made possible by the system. The components contained in the transit time tester are miniaturized in such a way that they can be arranged in a standard letter of, for example, a weight of no more than 60 g, a thickness of less than 5 mm and the dimensions of not greater than 210 mm×100 mm.

The transit time tester is preferably supplied with power by batteries with a high energy density such as, e.g. lithium ion polymer batteries which are accommodated in an impact-resistant housing with an internally integrated short-circuit and under voltage protection. To provide better mass distribution and to maintain the flexibility of the transit time tester, a number of narrow batteries connected in parallel are provided according to the invention.

According to one feature of the invention, all components are designed to be flexible in order to prevent the transit time tester from being destroyed at the rerouting rollers of the mail sorting machines, even the ground plane needed for the GPS antenna consists of a flexible pointed circuit, according to the invention, if the size of the ground plane needed should impair the flexibility of the transit time tester.

According to the invention, the components of the device are distributed within the transit time tester in such a manner that the center of gravity is located in the center of the transit time tester. According to a further embodying feature of the invention, no electronic components are preferably positioned within the stamping zones of the letter-shaped transit time tester. The circuit board with the ceramic element of the GPS antenna is preferably positioned centrally within the transit time tester.

If an external data medium is used, e.g. a micro secure digital card, the slot is preferably arranged perpendicularly to the direction of letter passage in the sorting machines in order to prevent the card from slipping out of the slot due to the accelerations and vibrations to be expected in the sorting machine.

Finally, it is proposed, according to the invention, that when the GPS receiver is arranged separately, the individual assemblies of the device are connected to one another by a combination of rigid and flexible circuit boards.

BRIEF DESCRIPTION OF THE DRAWINGS

The above mentioned and other concepts of the present invention will now be described with reference to the drawings of a preferred embodiment of the present invention. The illustrated embodiments are intended to illustrate, but not limit the invention. The drawings contain the following figures and features:

FIG. 2 shows a flow chart of the mail consignments pass through a number of typical processing and transportation processes FIG. 3 block diagram showing relationship of FIGS. 3A and 3B, FIGS. 3A-3B shows a flow chart of a mailing event, FIG. 5 shows the distance since interruption determination, FIG. 6 shows a determination of the last position finding before interruption of the GPS link, FIG. 7 shows a determination of misrouting, FIG. 8 shows a block diagram of the relationship of FIGS. 8A-8E, FIGS. 8A-8E shows the sequence of control during transportation.

DETAILED DESCRIPTION OF INVENTION

In the text which follows, an illustrative embodiment of the invention will be described.

Figure 1:
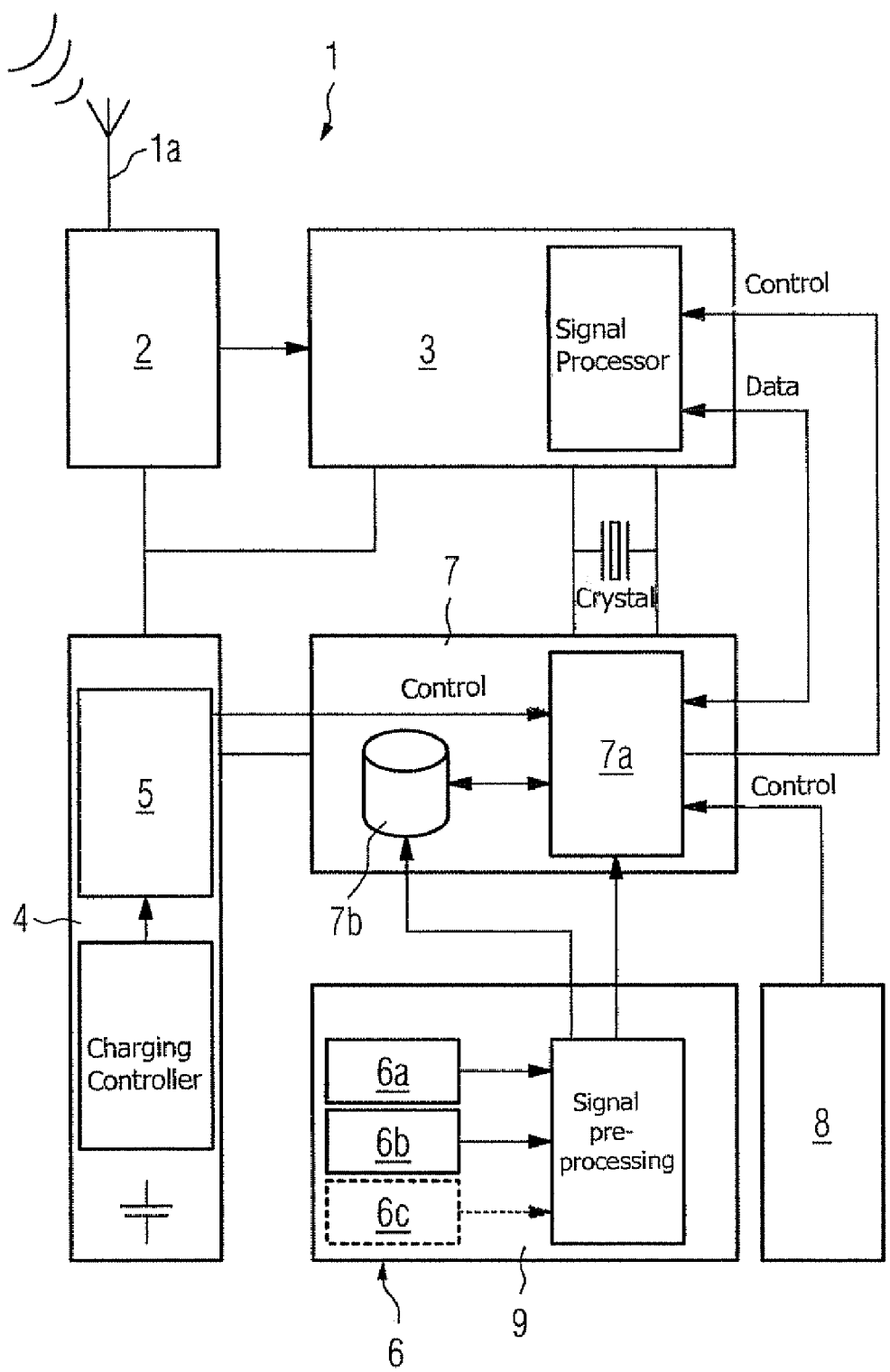
FIG. 1 shows a block diagram of the basic structure of the GPS-based data logger of the invention.

In the block diagram of FIG. 1, the basic structure of the GPS-based data logger of the invention, called transit time tester L in the text which follows, is shown diagrammatically. It is used for monitoring transit time of mail consignments and is designed in terms of dimensions and weight corresponding to a standard letter of less than 60 g weight, a thickness of less than 5 mm and a width-to-height ratio of 210 mm×100 mm. The logger cannot be recognized as transit time tester L externally.

The transit time tester L contains the GPS receiver 1 with the antenna 1a, the basic components of which are the GPS receiver 2 and the GPS signal processor 3, and an intelligent power supply 4 with monitoring 5 of the available energy, sensors 6, 6a, 6b, 6c . . . for detecting various transportation and processing processes, a controller 7 with the microcontroller 7a and the memory 7b for controlling the transit time tester and the event generator 8 for starting special procedures of the transit time tester L.

The process detection assembly 9 enables the microcontroller 7a to detect various processes and to monitor whether a transportation process is still ongoing or has already ended, which can be detected by the rest state of the transit time tester L or the transition into another type of transportation. As will be explained later, the transit time tester L can be used for tracing, and recording over a number of days, both the time and the route of a mail consignment.

As a rule, mail consignments pass through a number of typical processing and transportation processes which are shown and described in a flow chart in FIG. 2. The transportation processes begin with the handing-over of the consignment into the mailbox and end with the delivery to the receiver; they are characterized by the use of various means of conveyance, for example motor vehicle, aircraft but also, e.g. the sorting machines. The nature of the means of conveyance has an influence on the reception of the satellite signals. In the mail centers, the consignments pass through a number of mechanical sorting steps where the consignments are transported at high speed as a result of which very high transverse accelerations arise at the rerouting rollers, which can be measured by means of the acceleration sensors. Since such transverse accelerations only occur in the sorting machines, the machine passes, and thus the location of a consignment in a mail or sorting center can be unambiguously determined and stored. For the postal services, the first and last mile (box emptying and delivery) and when and where the consignments have been sorted are of special interest.

Before the start, the transit time tester L is initialized. For this purpose, a list of the geographic coordinates of all mail centers used by the respective postal service and the geographic coordinates of the start and destination and other data for controlling the transit time tester L are stored in the memory of the controller 7. To avoid energy-consuming and long-lasting cold starts, the current almanac data are also loaded into the GPS receiver 2 during the initialization of the transit time tester L. For relatively long measurements (greater than one week), the necessary almanac data of the next 2 weeks are even precalculated in the workstation computer and stored in the memory of the controller 7.

The transit time tester L is capable of recognizing changes in the type of transportation. It is assumed that when the means of conveyance are changed, the conditions of reception also change and thus a new attempt for establishing a link promises success. In contrast, it is assumed that when the consignment is in a means of conveyance, the conditions of reception will not change for a relatively long time. This is why, after a specified number of unsuccessful attempts, the GPS transmitter is switched off as long as the type of transportation or the means of conveyance do not change. Recognizing various types of transportation or transportation processes, respectively, allows different cycle times to be implemented for determining the location by the GPS. In this case, the GPS receiver 2 is switched on only periodically for a short time in each case corresponding to the specifications for the individual types of transportation which means a distinct reduction in the energy consumption.

The controller 7 monitors the current position of the transit time tester L. This makes it possible to determine whether the transit time tester L is located in a particular mail center and corresponding measuring regimes are to be started. Thus, for example, it is possible to determine whether the transit time tester L is located in the receiving mail center.

The sorting in the receiving mail center is followed, as a rule, by the delivery. The process of delivery is therefore of special significance for quality assurance because a correspondingly shorter cycle time for position finding can be activated for this purpose. If the sensors 6 of the process detector 9 detect the beginning of delivery in the previously defined time window, the cycle time provided is activated and deactivated again in the next relatively long rest phase.

Figure 3B:
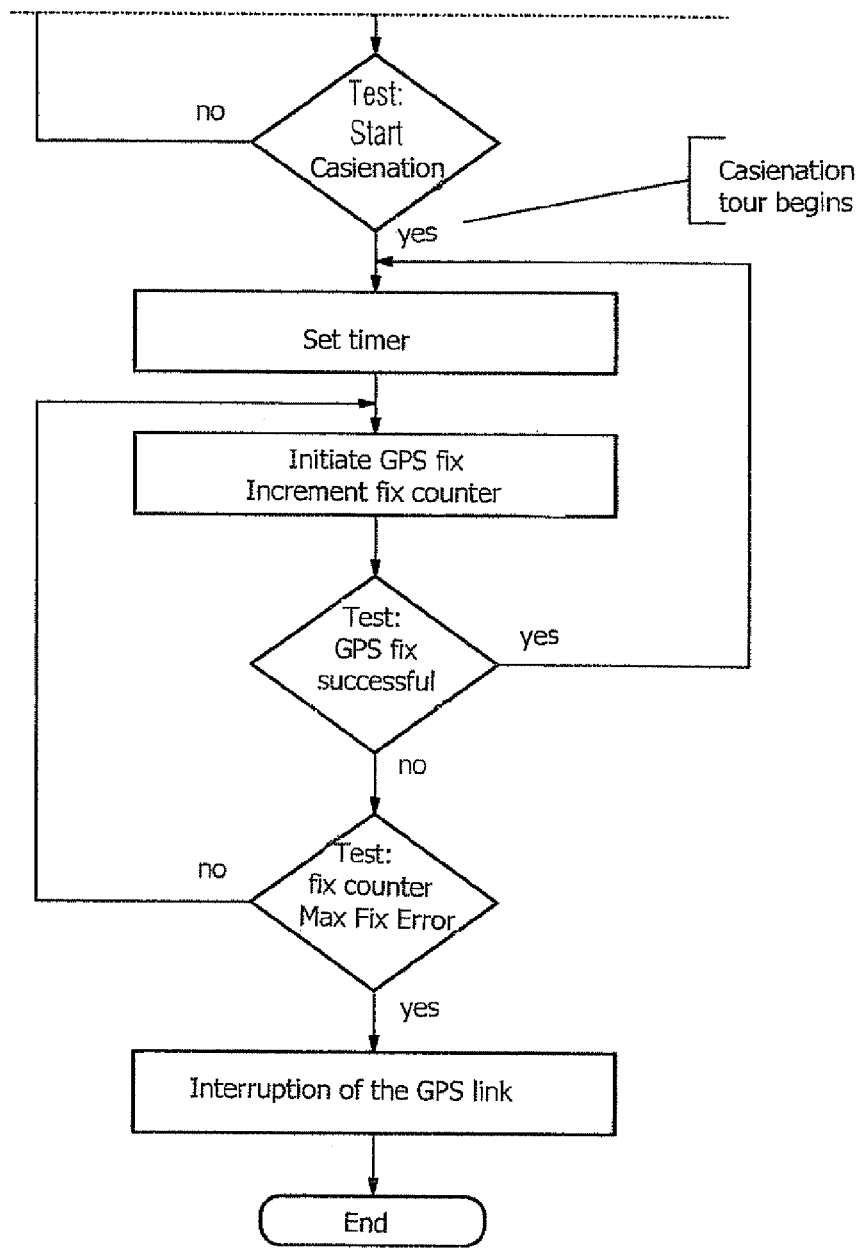

The event generator 8 makes it possible to store in the transit time tester L certain events which, in turn, are used for controlling the transit time tester L. As an example, the mailing in the mailbox will be mentioned. FIG. 3 shows a flow chart for this case. Using the event generator 8 (FIG. 1), the transit time tester L is informed that the consignment has been mailed in the mailbox. This event triggers an immediate position determination by the GPS receiver 2. As long as the transit time tester L is in the mailbox, rest position is detected by the acceleration sensors 6a. The cycle time for position determination can thus be increased. If no reception is possible within the mailbox, the precise position of the mailbox, and thus of the transit time tester L, is still known so that an energy-saving reestablishment of the link to the satellites is possible after leaving the mailbox.

Figure 4:
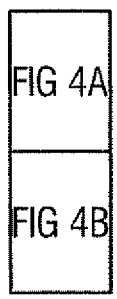
FIG. 4 shows a block diagram of the relationship of FIGS. 4A and 4B.
Figure 4A:
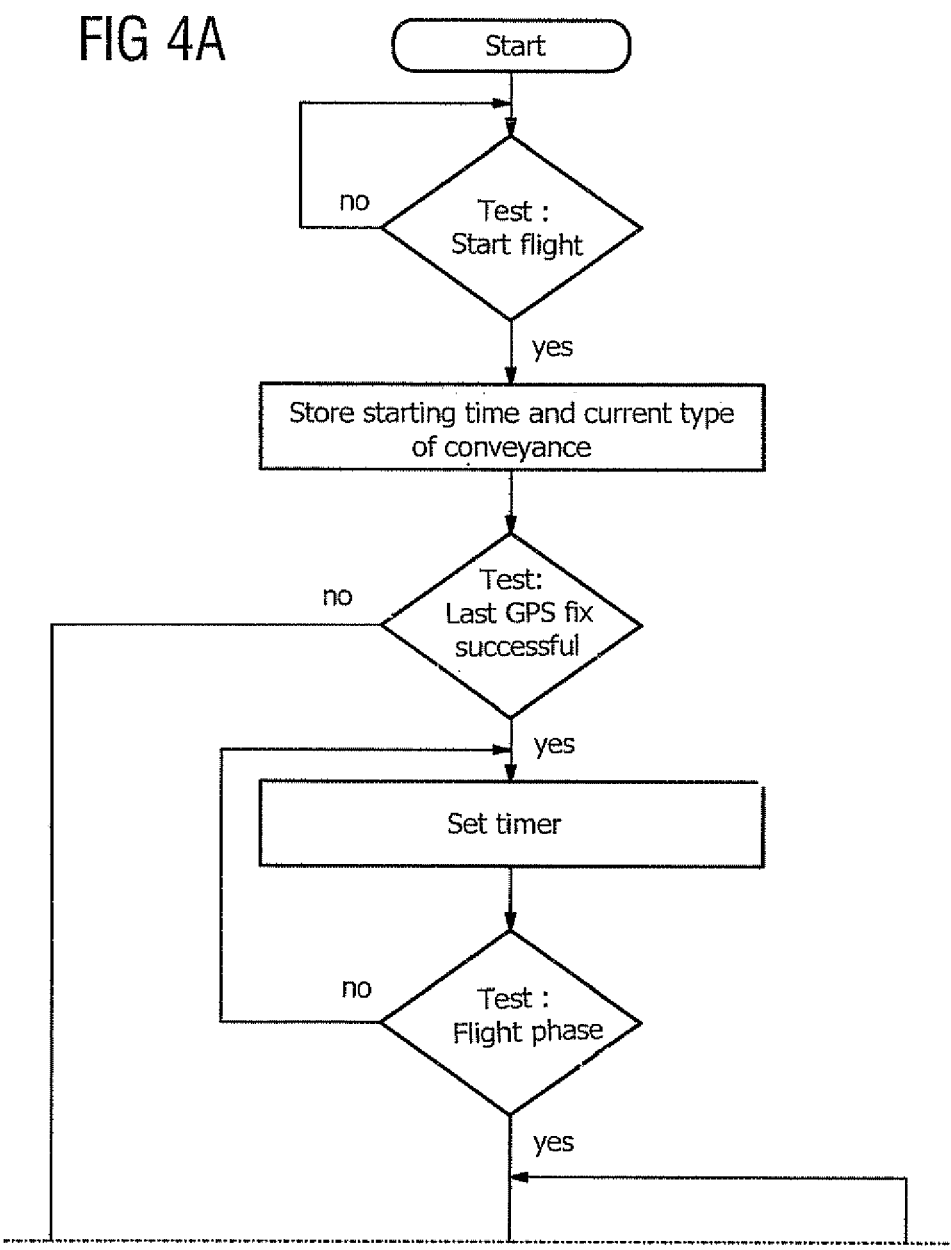
FIGS. 4A-4B shows a flow chart of the flight phase monitoring.
Figure 4B:
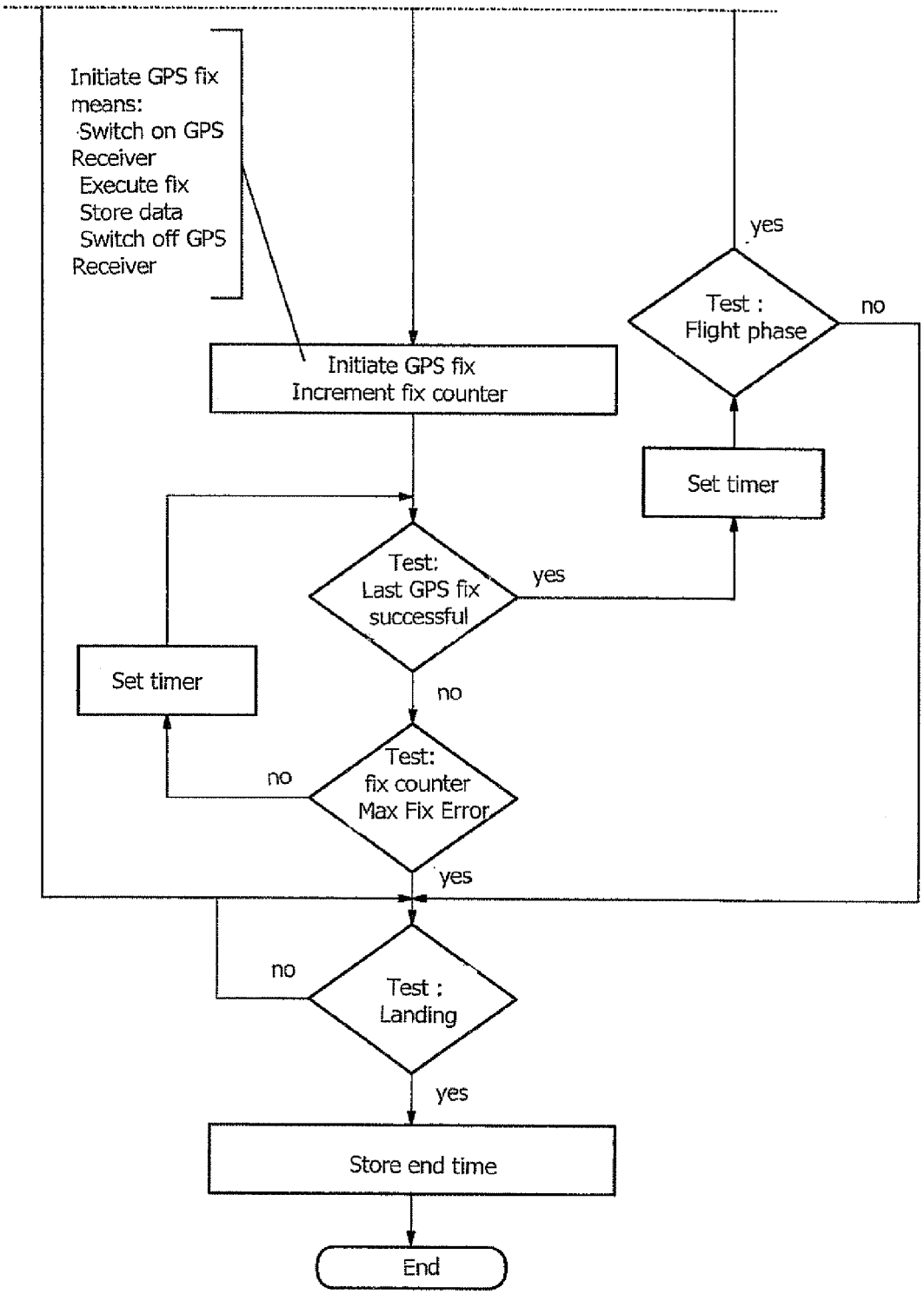

Since similar conditions prevail in freight compartments of aircraft, the GPS receiver is switched off on detection of the starting phase and reactivated only after detection of the landing phase. However, it is also possible to monitor the flight phase itself in better conditions of reception, e.g. when the consignments are transported in the passenger cabin of an aircraft. A typical control of flight phase monitoring is shown in the flow chart of FIG. 4.

To achieve a more rapid link establishment even after a flight, it is possible to proceed with the list of mail centers as in the case of position finding. In addition, the permissible relations can be defined via a matrix and non-existent links can be excluded if a list of the geographic coordinates of the airports used for the transportation of mail consignments were stored. The trigger is the detected landing. From the flight time, the approximate distance is then determined which the transit time tester L has traveled with the aircraft.

Since the geographic coordinates of the current location are used for establishing the link after a GPS link interruption, in order to avoid a cold start of the GPS receiver, the position of the transit time tester L can be determined with sufficient accuracy by means of the following methods. If the means of conveyance has been changed, it is assumed that conditions of reception have also changed. After having checked whether the position of the last position finding before interruption of the GPS link was within the expected space, the distance of the transit time tester L since interruption of the GPS link is determined from the duration of the individual types of transportation x average speed as is shown and simplified in FIG. 5.

If the link to the GPS satellites is interrupted only during transportation (e.g. after reloading), the average speed can be determined from the preceding GPS records since the beginning of the transportation. In this context, relatively short rest periods (e.g. standing times when tanking at the refueling station and similar) are also taken into consideration. If the distance since interruption of the GPS link is below a predetermined distance, recalculation of the position can be dispensed with and the GPS fix can be initiated with the position on interruption of the GPS link.

If, however, the transit time tester registers a machine pass after an interruption of the GPS link, the transit time tester is in a mail center. In this case, it is possible to determine the position unambiguously since the transit time tester has stored the coordinates of the mail centers. If the position of the last position finding before interruption of the GPS link is within the expected range, only mail centers located within the expected range are taken into consideration for determining the position. The controller determines the distance since interruption of the GPS link (duration of the individual types of conveyance X average speed). A circle with the radius of the distance since interruption of the GPS link is drawn around the position of the last position finding before interruption of the GPS link (FIG. 6). After that, a check is made whether the position of a mail center is located on this circle within the expected range. It is also possible that a number of positions are possible as a result, in which case it is attempted to establish a GPS link sequentially with the individual coordinates in accordance with a particular scheme.

If the last position finding before interruption of the GPS link is outside the expected space, it must be assumed that misrouting has occurred (FIG. 7). Here, too, a circle with a radius of the distance since interruption of the GPS link is drawn around the position of the last fix before interruption of the GPS link. When a number of mail centers are found, the solutions are discarded and a cold start is initiated.

Figure 8B:
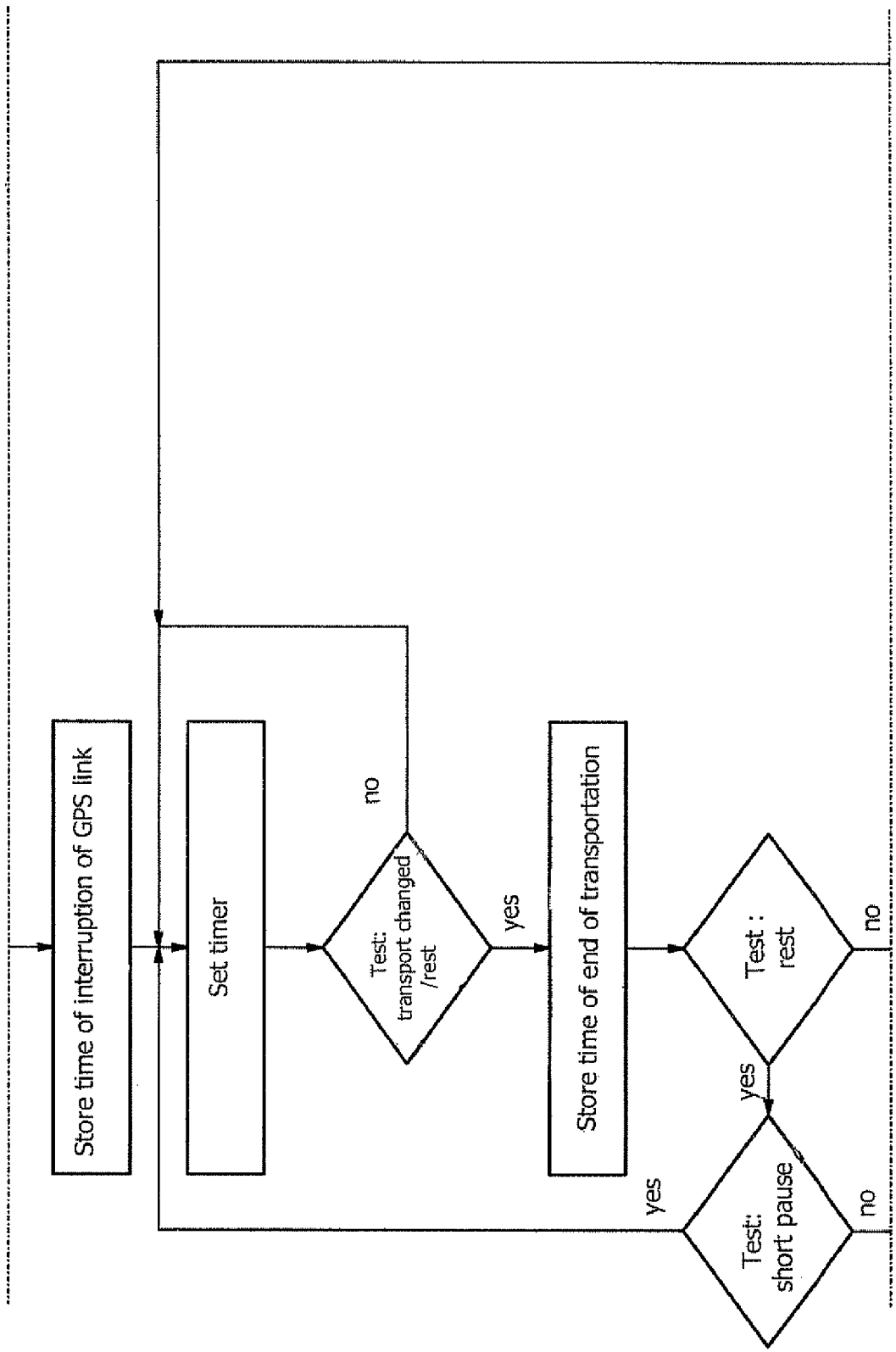
Figure 8C:
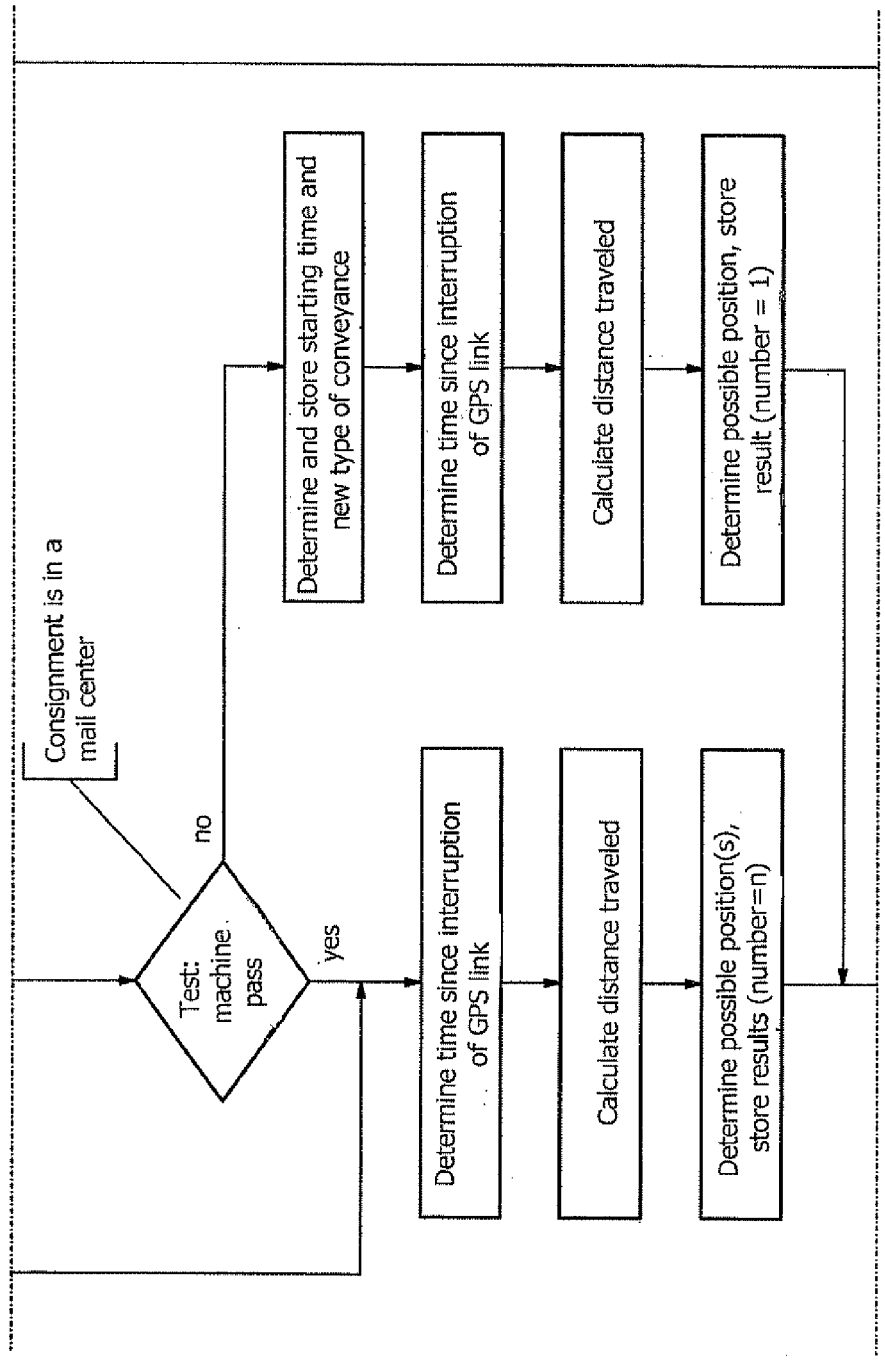
Figure 8D:
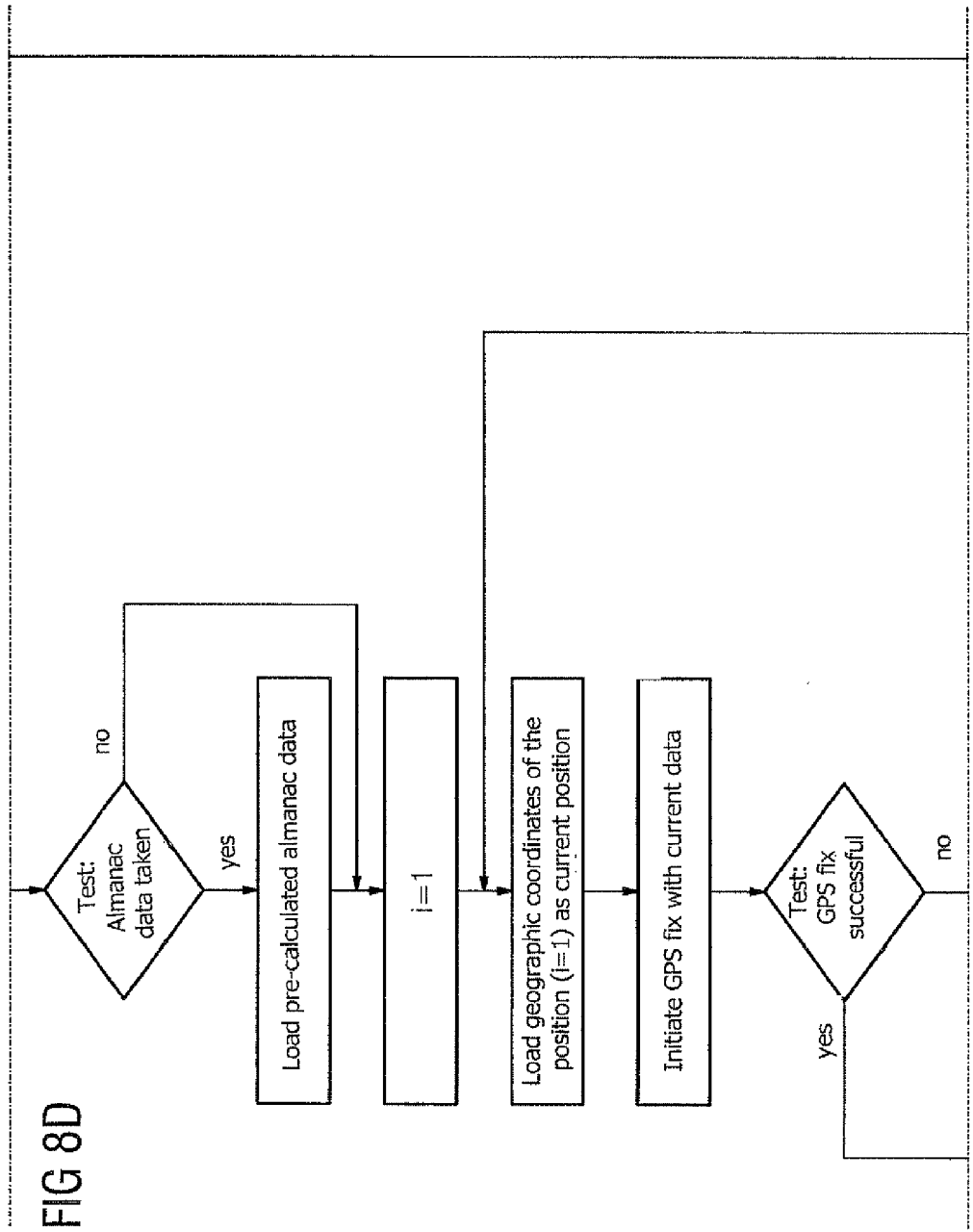
Figure 8E:
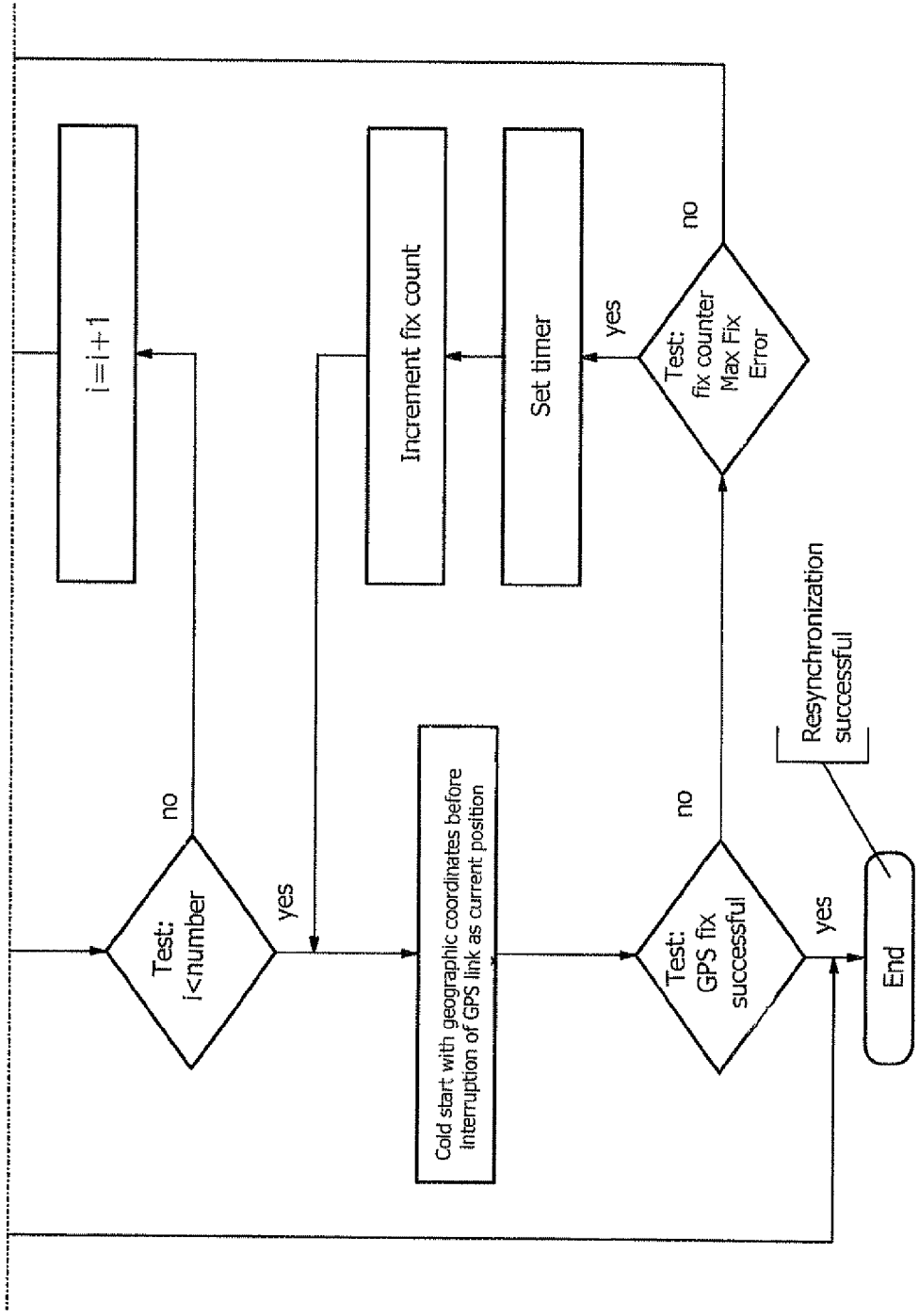

If during the continuation of one type of transportation (and thus the continued stay of the transit time tester in the same means of conveyance) a number of attempts of obtaining a GPS position determination fail, the GPS receiver is activated again only when the type of transportation (the means of conveyance) changes or a relatively long pause is detected. The sequence of control can be seen in the flow chart of FIGS. 8a and 8b.

The transit time tester is capable of recognizing machine passes in mail sorting machines. If the GPS receiver is switched off, it is activated for position finding. The controller checks whether the preconfigured cycle time and the energy reserves still available correspond to one another. If the energy still available is no longer sufficient for guaranteeing the measurement up to the destination, the cycle time is increased to the extent that recording of the complete route is possible, but with a lesser number of position points.

For the individual types of transportation and detectable logistical processes, different cycle times for activating the transit time tester can be configured. If the transit time tester is at rest, the GPS receiver is only activated, after a successful position determination, when the maximum possible time has elapsed without a relatively long procedure being required for position determination, or if the transit time tester has been moved again.

The transit time tester is supplied with energy via batteries with high energy density (e.g. lithium ion polymer batteries). The current energy reserve is calculated periodically by the controller. The controller prevents lowering below a predetermined measure so that it. cannot come to any loss of data and not to a total discharge of the batteries.

Figure 9:
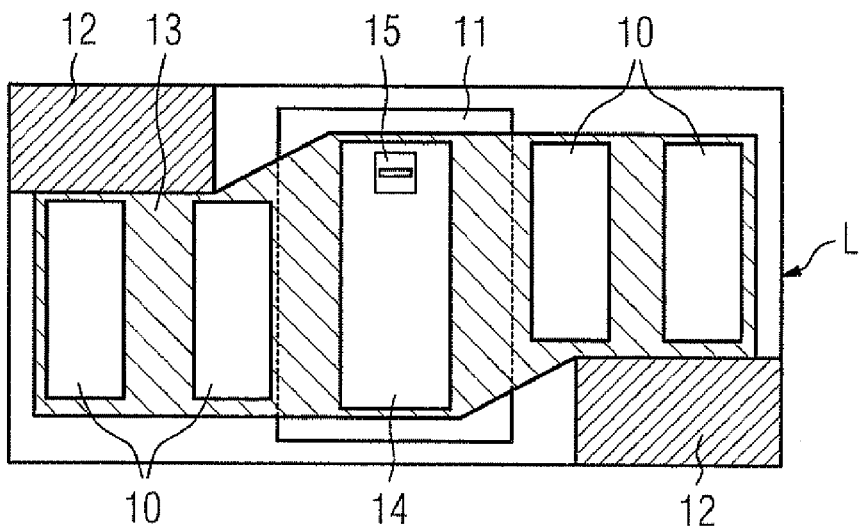
FIG. 9 shows diagrammatically a transit time tester L according to the invention.
Figure 10:
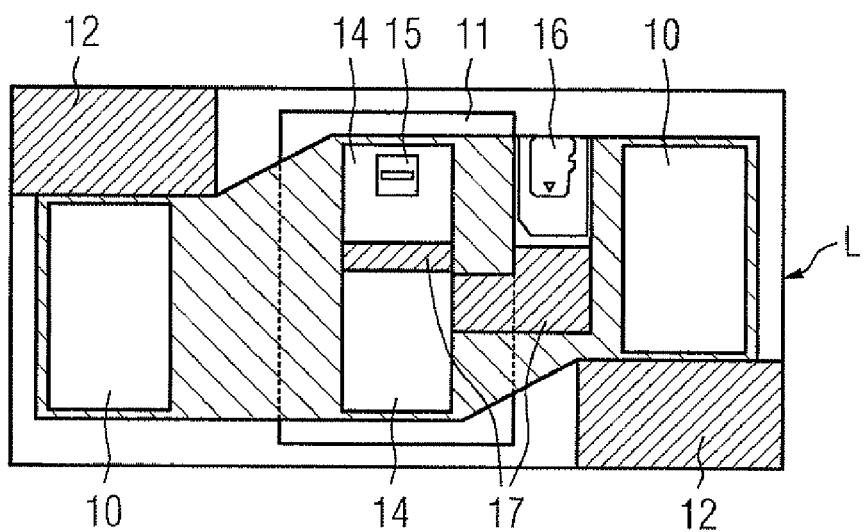
FIG. 10 shows diagrammatically a transit time tester L according to the invention.

FIGS. 9 and 10 diagrammatically show a transit time tester L according to the invention in standard letter form. The two layouts show possible arrangements of the components of the transit time tester L. Lithium ion polymer batteries 10 are accommodated in impact-resistant housings with internal integrated short-circuit and under voltage protection in order to protect the batteries against damage and accidental short circuits. However, other energy carriers having corresponding characteristics can also be used. To obtain better mass distribution and maintain the flexibility of the consignment, a number of narrow batteries connected in parallel are used. The flexibility is required in order to prevent the transit time tester from being destroyed at the rerouting rollers of the mail sorting machines. The ground plane needed for the GPS antenna 15 is implemented by means of a flexible circuit board 11. The components are distributed in such a manner that the center of gravity is located in the center of the transit time tester L and a mail consignment which contains this transit time tester L cannot stand up in mail sorting machines and can be destroyed.

In at least one of the stamping zones 12, no electronic components are positioned. As can be seen in FIGS. 9 and 10, the flexible and rigid zones alternate in order to guarantee adequate flexibility of the transit time tester L at the rerouting rollers of the mail sorting machines. The spaces between the components are cushioned 13. The rigid circuit board 14 for the controller and the GPS receiver 2 (FIG. 1) is positioned centrally in order to keep the mechanical loading as low as possible and prevent a destruction of the ceramic element of GPS antenna 15. When an external data carrier is used, e.g. a microsecure digital card 16, the slot must be arranged perpendicularly to the direction of mail passage through the sorting machines so that the card 16 does not slip out of the slot due to the accelerations and vibrations to be expected. If the GPS receiver is arranged separately, the individual assemblies of the transit time tester L are connected to one another by a combination of rigid and flexible circuit boards via flexible conductor tracks 17.

The invention claimed is:

1. A method for monitoring the transit time of a small-size mail item to be conveyed, comprising:
    providing a transit time tester with dimensions and characteristics substantially corresponding to the small-size mail item to be conveyed and monitored, the transit time tester comprising:
        sensors for providing sensor data related to transportation and processing processes wherein several types of conveyances are utilized for transporting the small-size mail item as part of a sequence of transportation,
        a satellite-based positioning system having a receiver for receiving satellite signals through a satellite link,
        a storage media, and
        a microprocessor for determining from the sensor data a current type of conveyance;
    initializing the transit time tester, the initializing includes storing in the storage data media a plurality of geographic coordinates of a plurality of postal mail centers such that each of the plurality of geographic coordinates corresponds to one of the plurality of postal mail centers, each of the postal mail centers comprising a postal mail sorting machine;
    registering and storing movements of the small-size mail item by the transit time tester for later evaluation of the sequence of transportation, the movements stored in the storage media;
    selectively switching the receiver for the satellite-based positioning system on and off as a function of changing conditions of reception of the satellite signals and/or a current type of conveyance utilized for transporting the small-size mail item, the switching the receiver off creating an interruption of the satellite link; and
    detecting by the transit time tester of a machine pass in the postal mail sorting machine of one of the plurality of postal mail centers.

2. The method as claimed in claim 1, wherein cycle times used by the satellite-based positioning system for a small-size mail item having a determined geographic position are adapted to processes used for transporting and processing the small-size mail item.

3. The method as claimed in claim 2, further comprising:
    after the interruption of the satellite link: calculating a current position from data which was stored in the storage media prior to the interruption of the satellite link.

4. The method as claimed in claim 1, wherein take-off and/or landing phases of aircraft used for transporting the small-size mail item are determined via an evaluation of peak accelerations of the aircraft.

5. The method as claimed in claim 1, wherein flight phases of aircraft used for transporting the small-size mail item are detected with the aid of an air pressure sensor provided in the transit time tester.

6. The method as claimed in claim 1, wherein an effect on the reception of the satellite signals due to the type of conveyance utilized for transporting the small-size mail item is used as an indication of a quality of a position determination of the small-size mail item.

7. The method as claimed in claim 1, wherein the detecting includes sensing by an acceleration sensor of very high transverse accelerations resulting from rerouting the transit time tester at a speed greater than or equal to 3.0 m/s.

8. The method as claimed in claim 1, wherein the satellite-based positioning system switches off after a predetermined number of attempts if the type of transportation or the type of conveyance does not change and the conditions of reception in a type of conveyance remain the same over a relatively long time.

9. The method as claimed in claim 1, wherein the satellite-based positioning system receiver, for determining a position of the small-size mail item based on the type of conveyance and processes of transportation, is only switched on periodically for a short time in each case.

10. The method as claimed in claim 1, further comprising providing an event generator, implemented via infrared or RF remote control, which informs the transit time tester of a mailing of the small-size mail item in a mailbox which triggers an immediate position determination of the satellite-based positioning system receiver.

11. The method as claimed in claim 1, wherein the satellite-based positioning system receiver is switched off on detection of the take-off phase of the transport aircraft and is only reactivated after detection of the landing phase.

12. The method as claimed in claim 1, wherein only mail centers located within an expected range are taken into consideration for finding the transit time tester if a last position found before interruption of the satellite link lies within the expected range.

13. The method according to claim 1, wherein the transit time tester checks whether a preconfigured cycle time and an available energy reserve supplying components of the transit time tester correspond to one another.

14. The method as claimed in claim 13, wherein if the energy reserves are not sufficient, cycle times are increased sufficient to enable a recording of a complete transportation route for the small-size mail item but with a fewer number of position points along the transportation route.

15. The method as claimed in claim 1, wherein the initializing further includes storing in the storage media at least one data selected from the group consisting of:
geographic coordinates of a starting location,
geographic coordinates of a destination,
geographic coordinates of a location where initialization occurs,
occurring time interval for establishing the satellite link as a function of a current transportation process or the location, respectively, and
predicted transit time of the small-size mail item.

16. The method as claimed in claim 1, wherein the small-size mail item is a standard letter.

17. The method as claimed in claim 1, wherein the transit time tester includes a stamping zone where no electronic components are excluded.

18. The method as claimed in claim 1, wherein the transit time tester includes zones which alternate between a flexible zone and a rigid zone to provide adequate flexibility of the transit time tester at rerouting rollers of the postal mail sorting machines.

19. A method for monitoring the transit time of a small-size mail item to be conveyed, comprising:
providing a transit time tester with dimensions and characteristics substantially corresponding to the small-size mail item to be conveyed and monitored, the transit time tester comprising:
sensors for providing sensor data related to transportation and processing processes wherein several types of conveyances are utilized for transporting the small-size mail item as part of a sequence of transportation,
a satellite-based positioning system having a receiver for receiving satellite signals through a satellite link,
a storage media, and
a microprocessor for determining from the sensor data a current type of conveyance;
initializing the transit time tester, the initializing includes storing in the storage data media a plurality of geographic coordinates of a plurality of postal mail centers such that each of the plurality of geographic coordinates corresponds to one of the plurality of postal mail centers, each of the postal mail centers comprising a postal mail sorting machine;
storing movements of the small-size mail item for later evaluation of the sequence of transportation, the movements stored in the storage media;
selectively switching the receiver for the satellite-based positioning system on and off as a function of changing conditions of reception of the satellite signals and/or a current type of conveyance utilized for transporting the small-size mail item, the switching the receiver off creating an interruption of the satellite link
detecting by the transit time tester of a machine pass in the postal mail sorting machine of one of the plurality of postal mail centers; and
after the interruption of the satellite link: calculating a current position from data which was stored in the storage media prior to the interruption of the satellite link.

* * * * *